United States Patent
Kameyama (10) Patent No.: US 9,760,976 B2
(45) Date of Patent: Sep. 12, 2017

(54) IMAGE PROCESSING APPARATUS AND IMAGE PROCESSING METHOD

(71) Applicant: CANON KABUSHIKI KAISHA, Tokyo (JP)

(72) Inventor: Takaki Kameyama, Yamato (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 15/013,646

(22) Filed: Feb. 2, 2016

(65) Prior Publication Data

US 2016/0225167 A1    Aug. 4, 2016

(30) Foreign Application Priority Data

Feb. 3, 2015  (JP) .................. 2015-019612

(51) Int. Cl.
| | |
|---|---|
| *G06T 3/40* | (2006.01) |
| *G06T 3/00* | (2006.01) |
| *G06T 5/50* | (2006.01) |
| *H04N 5/232* | (2006.01) |
| *H04N 5/222* | (2006.01) |
| *G06K 9/52* | (2006.01) |
| *G06T 11/60* | (2006.01) |

(52) U.S. Cl.
CPC .................. *G06T 3/40* (2013.01); *G06K 9/52* (2013.01); *G06T 3/0012* (2013.01); *G06T 5/50* (2013.01); *G06T 11/60* (2013.01); *H04N 5/2226* (2013.01); *H04N 5/23206* (2013.01); *G06T 2200/21* (2013.01); *G06T 2207/10148* (2013.01); *G06T 2207/20221* (2013.01)

(58) Field of Classification Search
CPC  G06T 3/40; G06T 3/0012; G06T 5/50; G06T 11/60; G06T 2207/10148; G06T 2200/21; G06T 2207/20221; H04N 5/23206; H04N 5/2226; G06K 9/52

See application file for complete search history.

(56) References Cited

U.S. PATENT DOCUMENTS

| | | | |
|---|---|---|---|
| 2010/0103311 A1* | 4/2010 | Makii | ................ H04N 5/23293 348/369 |
| 2015/0117777 A1* | 4/2015 | Hsun | ...................... G06T 11/60 382/173 |

FOREIGN PATENT DOCUMENTS

JP        2010-177741 A     8/2010

* cited by examiner

*Primary Examiner* — Bhavesh Mehta
*Assistant Examiner* — Menatoallah Youssef
(74) *Attorney, Agent, or Firm* — Cowan, Liebowitz & Latman, P.C.

(57) ABSTRACT

An image processing apparatus generates, from the captured image, a plurality of images, which respectively corresponds to ranges of individual subject distances. The apparatus then applies image processing to at least one of the images in accordance with an instruction to change the shooting distance and field angle of the captured image, and generates a combined image that corresponds to the changed shooting distance and field angle. The image processing is applied to at least one of the images such that the size of a primary image in the combined image after changing the shooting distance and the field angle does not change.

12 Claims, 11 Drawing Sheets

IMAGE PROCESSING APPARATUS AND IMAGE PROCESSING METHOD

BACKGROUND OF THE INVENTION

Field of the Invention

The present invention relates to an image processing apparatus and an image processing method, and in particular relates to an image processing technique using distance information of a subject.

Description of the Related Art

In recent years, image capture apparatuses that can obtain distance information (also referred to as depth information) of individual subjects that exist in a captured scene are known (Japanese Patent Laid-Open No. 2010-177741). In Japanese Patent Laid-Open No. 2010-177741, by using distance information of individual subjects to present a bird's-eye map that indicates the positional relation, in the depth direction, of the subjects in a scene as well as a current focus distance, a photographer can easily understand which subject is currently in focus.

However, conventionally, distance information of a subject is exclusively used for image processing that is performed by an apparatus during shooting, and use by a user was not envisioned. For example, a method for allowing the user to easily perform image processing using distance information of a subject in an image processing application for captured images has not been suggested.

SUMMARY OF THE INVENTION

The present invention has been made in light of the aforementioned issues with conventional technology. The present invention provides an image processing apparatus and an image processing method that allow a user to easily use distance information of a subject in a captured image for image processing.

According to one aspect of the present invention, there is provided an image processing apparatus comprising: an obtaining unit configured to obtain a captured image and distance information of a subject; a generation unit configured to generate, from the captured image, a plurality of images that respectively correspond to ranges of individual subject distances, based on the distance information; an operation unit configured to receive input of an instruction to change a shooting distance and a field angle of the captured image; an image processing unit configured to apply image processing to at least one of the plurality of images; and a combining unit configured to combine the plurality of images that include an image to which the image processing has been applied, and generate a combined image corresponding to the changed shooting distance and field angle that were instructed through the operation unit, wherein a primary image is set from among the plurality of images, and the image processing unit applies image processing to at least one of the plurality of images, such that a size of the primary image in the combined image before and after changing the shooting distance and field angle does not change.

According to another aspect of the present invention, there is provided an image processing method to be executed by an image processing apparatus, comprising: obtaining a captured image and distance information of a subject; generating, from the captured image, a plurality of images that respectively correspond to ranges of individual subject distances, based on the distance information; receiving input of an instruction to change a shooting distance and a field angle of the captured image; applying image processing to at least one of the plurality of images; and combining the plurality of images that include an image to which the image processing has been applied, and generating a combined image corresponding to the changed shooting distance and field angle that were received, wherein a primary image is set from among the plurality of images, and the image processing is applied to at least one of the plurality of images, such that a size of the primary image in the combined image before and after changing the shooting distance and field angle does not change.

According to still another aspect of the present invention, there is provided a non-transitory computer-readable recording medium that stores a computer-executable program, the program, when executed by the computer, causing the computer to function as an image processing apparatus comprising: an obtaining unit configured to obtain a captured image and distance information of a subject; a generation unit configured to generate, from the captured image, a plurality of images that respectively correspond to ranges of individual subject distances, based on the distance information; an operation unit configured to receive input of an instruction to change a shooting distance and a field angle of the captured image; an image processing unit configured to apply image processing to at least one of the plurality of images; and a combining unit configured to combine the plurality of images that include an image to which the image processing has been applied, and generate a combined image corresponding to the changed shooting distance and field angle that were instructed through the operation unit, wherein a primary image is set from among the plurality of images, and the image processing unit applies image processing to at least one of the plurality of images, such that a size of the primary image in the combined image before and after changing the shooting distance and field angle does not change.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

Figure 1:
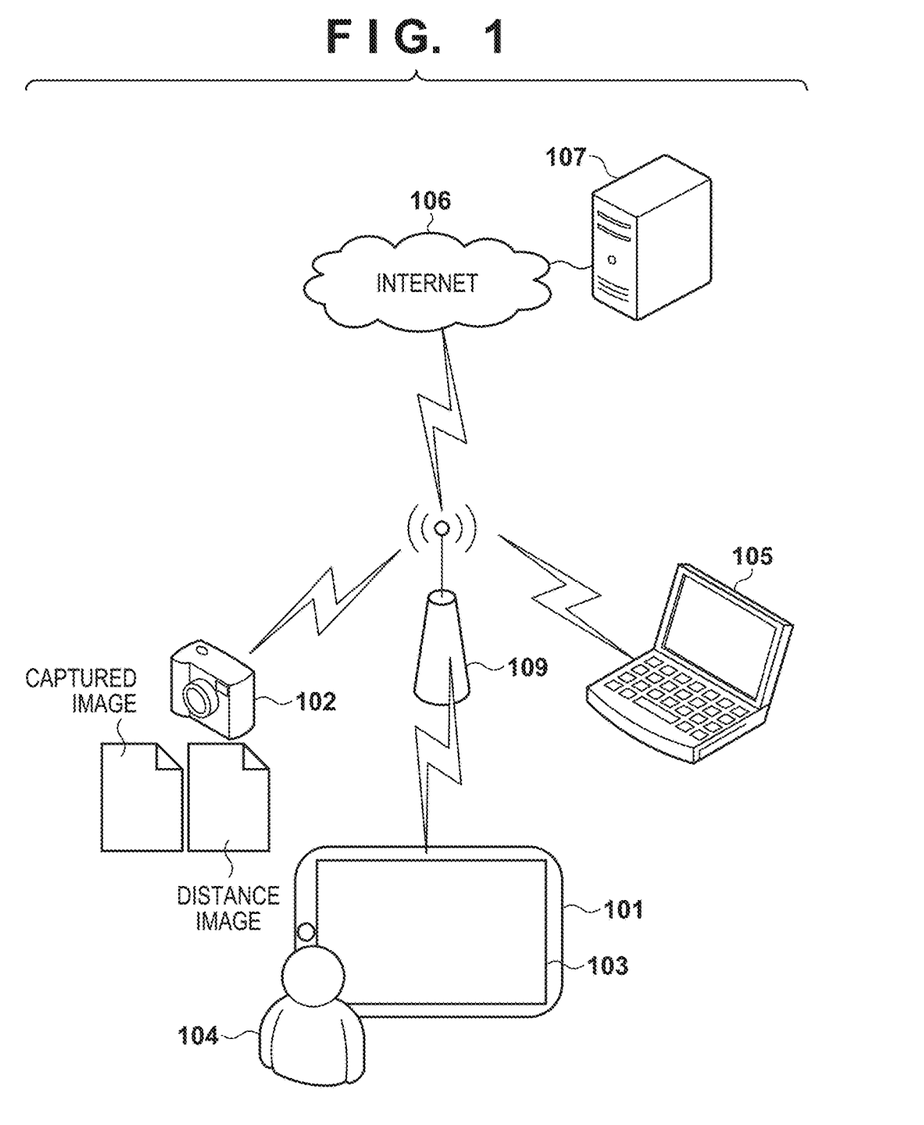
FIG. 1 is a diagram schematically showing usage forms of an image processing apparatus according to one embodiment of the present invention.

FIG. 1 schematically shows usage forms of an image processing apparatus according to one embodiment of the present invention. Here, a tablet computer 101, a digital camera 102, a personal computer (PC) 105 and a server 107 as specific examples of the image processing apparatus are shown. The tablet computer 101, the digital camera 102, and the PC 105 are connected to the same local network (LAN) through a router 109. The server 107 is communicably connected to the devices on the LAN through the Internet 106 as an example of a wide area network (WAN). Connection within the LAN may be wireless or wired, or a mixture of both.

FIG. 1 shows a mode in which a captured image that is to be image-processed and distance information of a shot scene in the captured image exist in the digital camera 102, and the tablet computer 101 or the PC 105 obtains the captured image and the distance information from the digital camera 102 and performs image processing. However, any of the tablet computer 101, the digital camera 102, the personal computer (PC) 105, and the server 107 can function as the image processing apparatus according to the present invention. More generally, the present invention can be realized in any suitable device that can obtain a captured image that is to be image-processed and distance information of a shot scene in the captured image, and can execute an image processing application that allows a user to perform image processing on the captured image using the distance information. Note that the image processing apparatus can be realized by a plurality of devices, such as the case in which the image processing application has a mode like a web application, and the case in which a portion of the processing is executed by an external apparatus.

The case in which the tablet computer 101 stores and executes an image processing application for a captured image will be described below. However, if a touch operation is replaced with an operation of a pointing device such as a mouse, or combination of a cursor key of a keyboard and an execute key, the present invention can also be realized in the case in which the PC 105 or the server 107 executes the image processing application. Also in the digital camera 102, if the operation thereof is replaced with a touch operation similar to that of the tablet computer 101, an operation on a direction key or the like, a similar image processing application can be implemented.

The tablet computer 101 obtains a captured image and distance information corresponding to the captured image from the digital camera 102 through the LAN. The obtaining method is not limited, and the captured image and the distance information may be directly transferred from the digital camera 102 to the tablet computer 101, or may be obtained by being attached to an e-mail and transmitted from the digital camera 102 to a server, and the tablet computer 101 receiving the e-mail from the server. In addition, the digital camera 102 and the tablet computer 101 may be directly connected with a cable so as to transfer the captured image and the distance information, or the captured image and the distance information may be read by the tablet computer 101 from a memory card.

Figure 2:
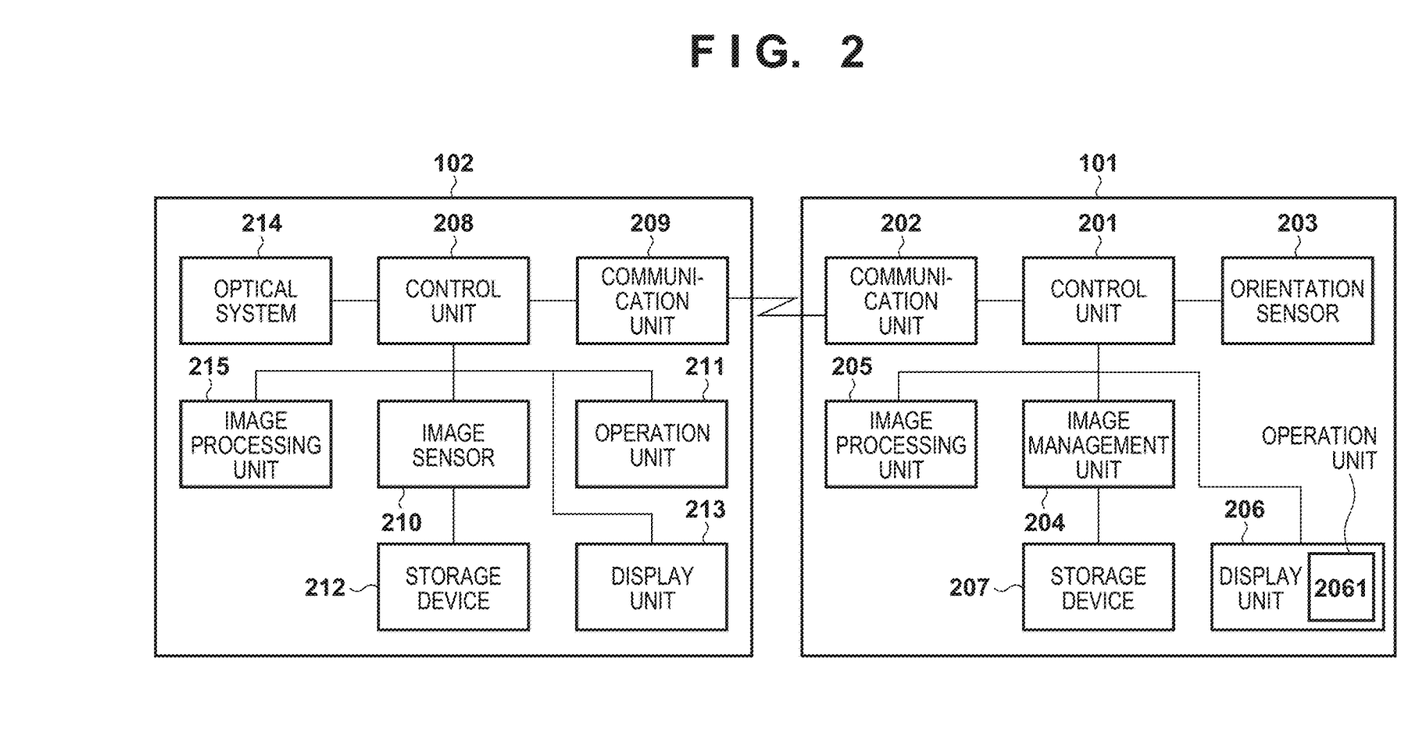
FIG. 2 is a block diagram showing a functional configuration example of a tablet computer 101 and a digital camera 102 in FIG. 1.

FIG. 2 is a block diagram showing a functional configuration example of the tablet computer 101 and the digital camera 102 in FIG. 1. The digital camera 102 is provided with an optical system 214, an image sensor 210, a control unit 208, a storage device 212, an image processing unit 215, a display unit 213, an operation unit 211, and a communication unit 209. Note that functional blocks other than those shown in FIG. 1 may be added. For example, a sensor that detects movement of the digital camera 102 for image stabilization may be added.

The optical system 214 has a lens, a shutter, and a diaphragm, and the control unit 208 can control a focus distance, an opening amount of the diaphragm, and opening and closing of the shutter. The image sensor 210 converts an optical image formed on an image capturing plane by the optical system 214 into an electrical signal for each pixel and outputs the electrical signal.

The control unit 208 has, for example, a programmable processor (hereinafter, a CPU), a nonvolatile memory such as a ROM, and a volatile memory such as a RAM, and causes the CPU to execute a program stored in the ROM and controls the units so as to realize the functions of the digital camera 102. The control unit 208 realizes automatic exposure control (AE) and automatic focus detection (AF) based on luminance information, contrast information or the like of a captured image in the image sensor 210.

The storage device 212 stores captured images, distance images and the like. The storage device 212 may be configured with at least one of a detachable storage medium such as a memory card and a fixed storage medium.

The image processing unit 215 performs A/D conversion, noise reduction processing, edge enhancement processing, gamma correction processing and the like on an image signal output from the image sensor 210, and generates RAW image data. The image processing unit 215 also performs white balance adjustment processing, developing processing such as demosaic processing, encoding processing and the like on RAW image data, as necessary. Some of or all the functions of the image processing unit 215 may be realized by the control unit 208 in a software-like manner.

The display unit 213 displays a live view image at the time of shooting stand-by or moving image capture, captured images, various types of information such as the status of the digital camera 102 and various setting values, a user interface such as a menu screen and the like. The display unit 213 is typically a flat panel display, and may be provided with a touch panel.

The operation unit 211 is a group of input devices for sending various instructions to the digital camera 102 from a user, and is constituted by a button, a key, a lever, a switch, and a touch panel, for example. A release button for sending a shooting preparation instruction and a shooting instruction, a power supply switch, a direction key, a determination button, a menu button and the like are included.

The communication unit 209 is a communication interface for performing transmission/reception of control commands and data with an external apparatus. For example, communication protocols typically used in a digital camera when communicating with an external apparatus include the following: PTP (Picture Transfer Protocol) and MTP (Media Transfer Protocol), or protocols in relation to NFC (Near Field Communication) such as ISO/IEC 14443A/B and JIS X6319-4. Note that the communication unit 209 may communicate with an external apparatus using wired connection based on a standard such as USB (Universal Serial Bus) or HDMI (High-Definition Multimedia Interface: registered trademark). Communication with an external apparatus may also be performed using a wireless LAN or wireless connection based on a standard such as Bluetooth (registered trademark). In addition, direct connection to an external apparatus may be adopted, or connection via a server or a network such as the Internet may be adopted.

Note that a captured image and distance information are usually transferred from the storage device 212 to an external apparatus via the communication unit 209, but may be transferred to the external apparatus without passing through the communication unit 209, in the case where the storage medium has a wireless communication function.

The digital camera 102 has a shooting mode for generating distance information of a captured scene, and executes an operation of generating distance information in addition to usual shooting operations in the case where this shooting mode is set. In this embodiment, distance information of a captured image has the same number of pixels as the captured image, and has a format of a distance image in which the value of each pixel indicates a distance, although the format is not limited thereto. The number of pixels in the captured image and the number of pixels in the distance image may be different. For example, the distance image being constituted vertically and horizontally by half the number of pixels of the captured image so as to have half the resolution of the captured image. Alternatively, information indicating the position and distance of the area of a specific subject (e.g., a person) that exists in the captured scene may be used. In addition, data of the captured image and data of the distance image may be in a format in which the data exist individually, or in a format in which the data is gathered as one piece of data. Note that the method for generating such distance information using a digital camera is not particularly limited, and any suitable methods including various methods described in Japanese Patent Laid-Open No. 2010-177741 can be used, for example. The control unit 208 stores generated captured images and distance images in the storage device 212.

The tablet computer 101 is typically a slate-shaped mobile information terminal that has a touch panel display and does not have a hardware keyboard, and the functional configuration thereof is the same as that of a general information processing apparatus (PC). In other words, the tablet computer 101 is provided with a control unit 201, a communication unit 202, an orientation sensor 203, an image management unit 204, an image processing unit 205, a display unit 206, and a storage device 207.

The communication unit 202 is a communication interface for performing transmission/reception of control commands and data with an external apparatus. For example, the communication unit 202 receives a captured image and distance information from the digital camera 102 or the PC 105 connected to the same network, the server 107 on the Internet or the like. The communication unit 202 can have various modes, similarly to the communication unit 209 of the digital camera 102.

For example, the control unit 201 has a programmable processor (hereinafter, a CPU), a nonvolatile memory such as a ROM, and a volatile memory such as a RAM, causes the CPU to execute a program stored in the ROM, and controls the units to realize the functions of the tablet computer 101.

The orientation sensor 203 is a sensor that detects the orientation of the tablet computer 101, and may be a triaxial gyro sensor, for example.

The image processing unit 205, based on a captured image and distance information that have been obtained, separates the captured image into a plurality of images such that each of the plurality of images includes only a subject in a specific distance range. The image processing unit 205 also applies decoding processing if the obtained captured image is encoded, and developing processing if the obtained captured image is a RAW image. Furthermore, the image processing unit 205 executes recognition of a facial area as an example of a specific subject area, and individual recognition processing based on a feature amount of registered faces. The image processing unit 205 also provides an image processing function that is typically provided by an image processing application. Note that some of or all the functions of the image processing unit 215 may be realized by the control unit 201 in a software-like manner, or may be realized by dedicated hardware such as FPGA, ASIC or the like.

The storage device 207 is a nonvolatile storage device as typified by SSD and HDD, on which an OS, applications, image data and the like are stored. The image management unit 204 manages data obtained via the communication unit 202 including captured images and distance information, image data processed by the image processing unit 205, and the like. For example, information for realizing undo processing in the image processing application, association of an image to be processed with corresponding distance information, and the like are also managed by the image management unit 204. The display unit 206 is a flat panel display such as an LCD, an organic EL display or the like, and is provided with an operation unit 2061 that is a touch panel. The display unit 206 displays graphical user interfaces (GUIs) of the OS and applications in accordance with control from the control unit 201.

Figure 3:
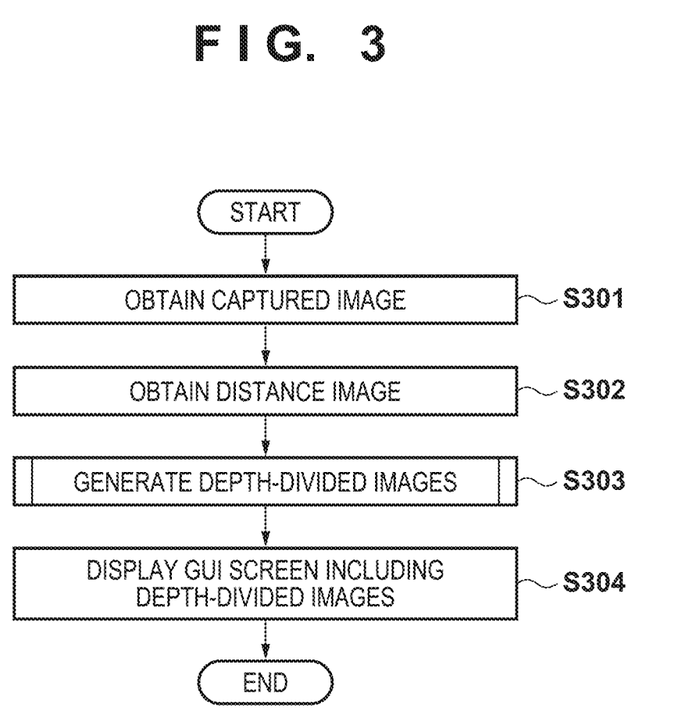
FIG. 3 is a flowchart for describing an overall processing flow of an image processing application according to the embodiment.

Next, a flow of overall processing of an image processing application according to this embodiment will be described with reference to the flowchart in FIG. 3.

When a starting operation is performed, for example, a tapping operation on an icon of the image processing application displayed on the display unit 206 is performed through the operation unit (touch panel) 2061, the control unit 201 reads out the image processing application from the storage device 207 and executes the image processing application. The control unit 201 then displays a GUI for selecting an image to be processed, such as, for example, a file browsing GUI provided by the OS, and waits for a user instruction.

When a user specifies a captured image file to be processed, the control unit 201 obtains the specified captured image and distance information (distance image) corresponding thereto from the storage device 207 (S301 and S302).

In S303, the control unit 201 generates a plurality of images from the captured image using the image processing unit 205. Specifically, the image processing unit 205 acquires, from the distance image, the distribution of distances at which a subject exists, and divides a distance range of the subject into a plurality of distance ranges. The image processing unit 205 then extracts, for each of the divided distance ranges, a corresponding image area of the subject from the captured image, and generates a plurality of images from the captured image. Hereinafter, the generated images are referred to as depth-divided images. The image processing unit 205 stores the generated depth-divided images in the storage device 207 in association with the captured image and the distance image, for example.

Figure 4:
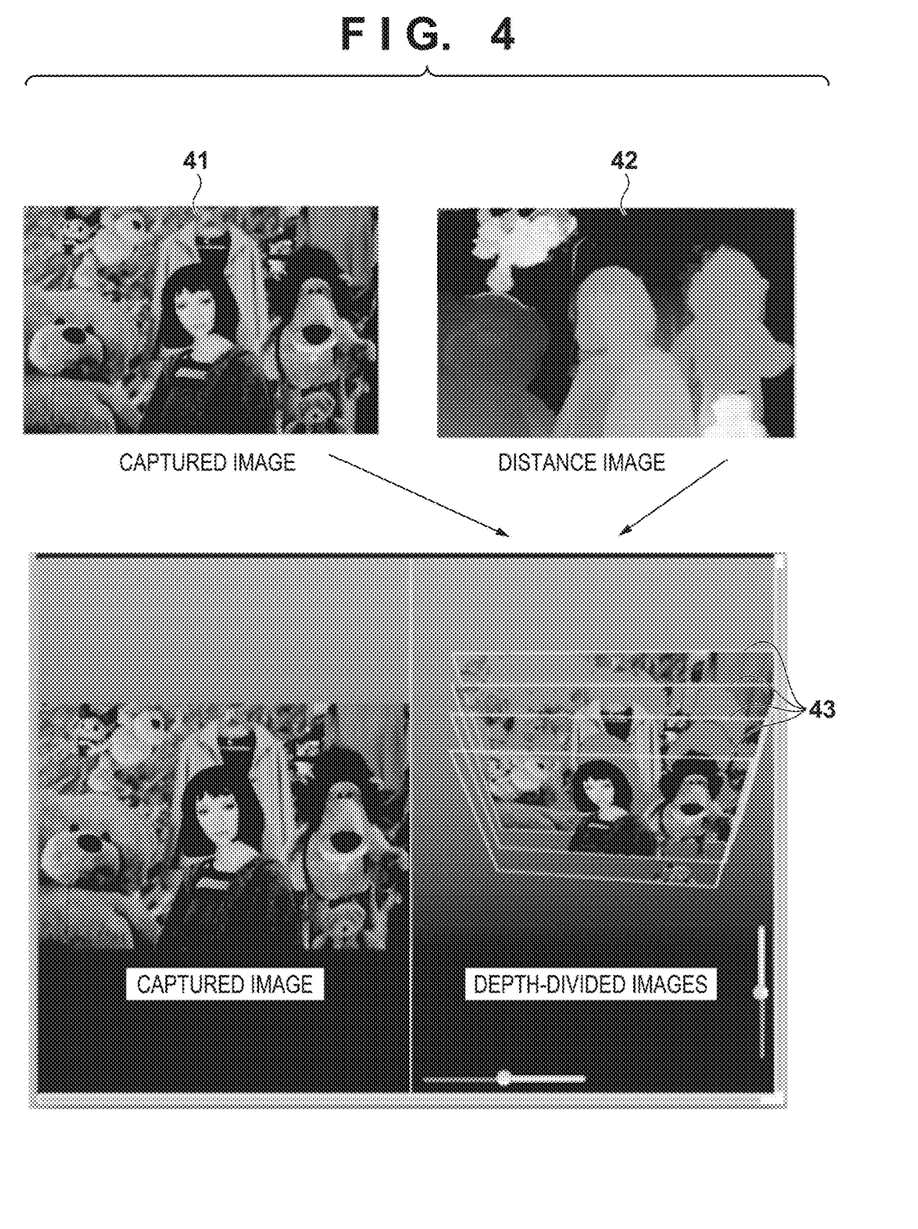
FIG. 4 is a diagram showing examples of a captured image, a distance image, and depth-divided images.

FIG. 4 shows examples of a captured image, a distance image, and depth-divided images. A distance image 42 is a monochromatic image that has the same number of pixels as the captured image 41, and in which each of the pixel values (luminance values) indicates a subject distance of the corresponding pixel. The image processing unit 205 divides the range of the subject distances based on the distribution of the pixel values of the distance image 42 (i.e., distribution of the subject distances), extracts a corresponding area of the captured image for each of the ranges of the subject distances, and generates depth-divided images 43. In the examples of FIG. 4, the range of the subject distances is divided into four, and the depth-divided image 43 is generated for each of the ranges. As shown in FIG. 4, the depth-divided images 43 have a subject area that exists in the corresponding distance range, and in areas of the subject that exist in other distance ranges, either pixels are not included or transparent pixels are arranged.

In S304, the control unit 201 displays the generated depth-divided images in an area within the GUI of the image processing application, in a form that allows the scale of corresponding distances to be understood, and that allows the depth-divided images to be individually selected, and waits for a selecting operation by the user.

Figure 5:
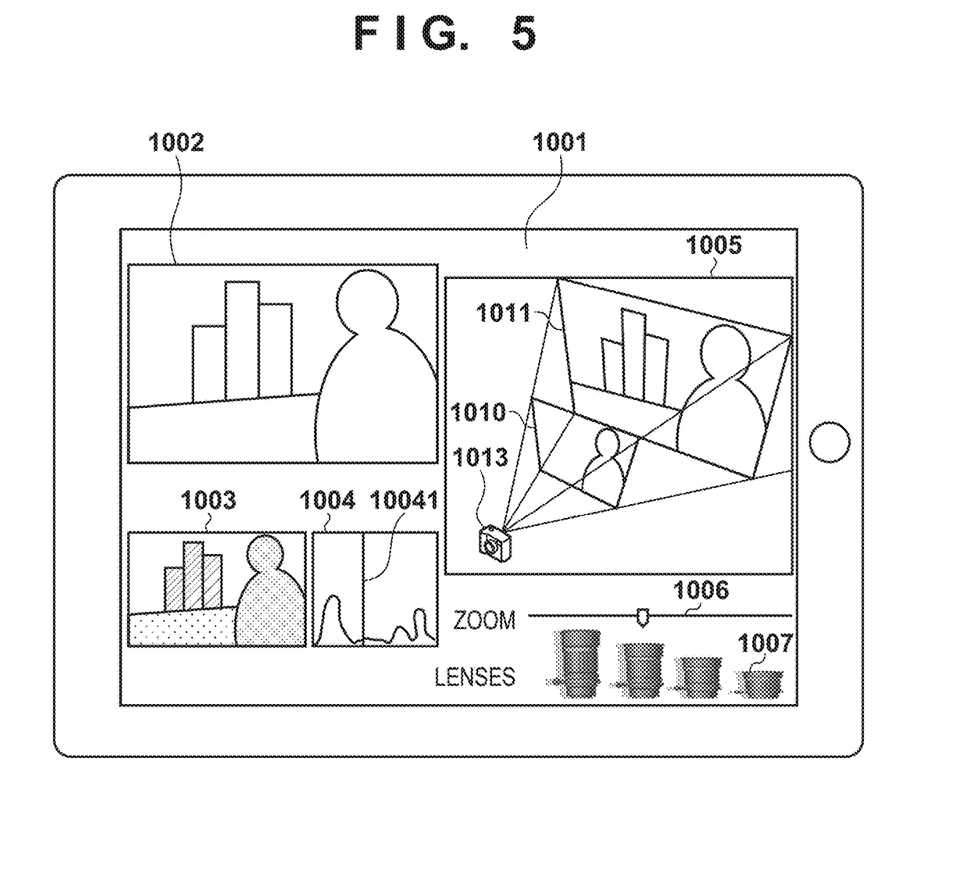
FIG. 5 is a diagram showing an example of a GUI in an image processing application according to the embodiment.

FIG. 5 schematically shows an example of a GUI (editing screen) 1001 for performing image editing using a depth-divided image, in the image processing application according to this embodiment. On the left half of the editing screen, a captured image 1002 to be processed and a corresponding distance image 1003 and histogram 1004 are respectively displayed in separate areas. In addition, an indicator 10041 that indicates a boundary for generating divided images is superimposed and displayed on the histogram. On the other hand, on the right half of the edition screen, a display area 1005 for generated depth-divided images and a zoom slider 1006 are provided.

In this embodiment, generated depth-divided images 1010 and 1011 are displayed like a projection surface of a view volume used in perspective projection, such that the depth-divided image corresponding to a shorter distance is smaller, and the depth-divided image corresponding to a longer distance is larger. However, this is merely an example, and display may be performed by another method. In addition, depth-divided images that are displayed may be reduced-size images. Here, display is performed such that a depth-divided image corresponding to a short distance is arranged at the front, a depth-divided image corresponding to a long distance is arranged at the back, and at least a part of or all of the depth-divided images are visible.

Note that in the example of FIG. 5, display is performed with a three-dimensional visual effect such that it appears like a plurality of depth-divided images are superimposed one on the other, but such a visual effect is not necessary. In addition, the depth-divided images do not have to be arranged from the front to the back, and any display format may be adopted as long as the depth-divided images are arranged in a direction in which the corresponding subject distances increase or decrease, such as, for example, the depth-divided images being arranged such that the distances increase from the right to the left.

A camera icon 1013 schematically indicates a shooting position (shooting distance). In FIG. 5, the depth-divided image 1010 corresponding to a subject on the short distance side and the depth-divided image 1011 corresponding to a subject on the long distance side, both having been generated based on one boundary 10041 shown in the histogram 1004, are displayed as the nearest surface and the farthest surface of the view volume. A zoom slider 1006 makes it possible to change how the depth-divided images in the captured image 1002 overlap and the sizes of the depth-divided images by changing a focal distance (field angle). A plurality of lens icons 1007 that respectively correspond to different focal distances (field angles) are displayed under the zoom slider 1006. Both the zoom slider 1006 and the lens icons 1007 are operation members (GUI parts) for changing the field angle. The zoom slider 1006 can continuously change the field angle, whereas the lens icons 1007 can directly specify a specific field angle corresponding to the icon.

When the zoom slider 1006 or the camera icon 1013 is continuously moved by dragging or the like, images in which the size of a primary subject does not change while the shooting range of a background changes are consecutively displayed as the captured image 1002. Such a display effect is referred to as dolly zoom (dolly in and dolly out).

In this embodiment, operation of the camera icon 1013, the zoom slider 1006, and the lens icons 1007 all correspond to an instruction to change both the field angle and the shooting distance of a captured image at the same time. More specifically, the control unit 201 generates a combined image by applying image processing in units of depth-divided images using the image processing unit 205 and combining the depth-divided images, thereby generating an image that appear like the field angle and the shooting distance of the captured image have been changed, without changing the size of the primary subject in the image.

In order to realize such an effect, the field angle and the shooting distance have a relation of defining one of the field angle and the shooting distance and thereby uniquely defining the other. Therefore, whichever is performed, change of the shooting distance by operating the camera icon 1013, or change of the shooting field angle through selection using the zoom slider 1006 or the lens icons 1007, the same effect can be acquired. In an initial state, the camera icon 1013 is displayed at a position corresponding to a field angle and a shooting distance during shooting, and the zoom slider 1006 is also displayed at a position corresponding to the field angle during shooting. If the position of the camera icon 1013 is changed, the control unit 201 updates the display position of the zoom slider 1006 so as to indicate the corresponding field angle. In addition, if the position of the zoom slider 1006 is changed, the control unit 201 updates the display position of the camera icon 1013 so as to indicate a corresponding shooting distance. If one of the lens icons 1007 is selected, the control unit 201 updates the display position of the zoom slider 1006 so as to indicate a field angle corresponding to the selected lens icon, and updates the display position of the camera icon 1013 so as to indicate a corresponding shooting distance.

Note that in the case where one of the camera icon 1013, the zoom slider 1006, and the lens icons 1007 is operated, the control unit 201 updates the display of the depth-divided images in a display area 1005 for depth-divided images as well as the display of the captured image 1002. Specifically, the control unit 201 updates the display of the depth-divided images so as to enable visual recognition of reduction/enlargement of each of the depth-divided images and change in the field angle, and displays a result of combining the depth-divided images as the captured image 1002, thereby reflecting a result of image processing in the display of the captured image 1002.

Figure 6A:
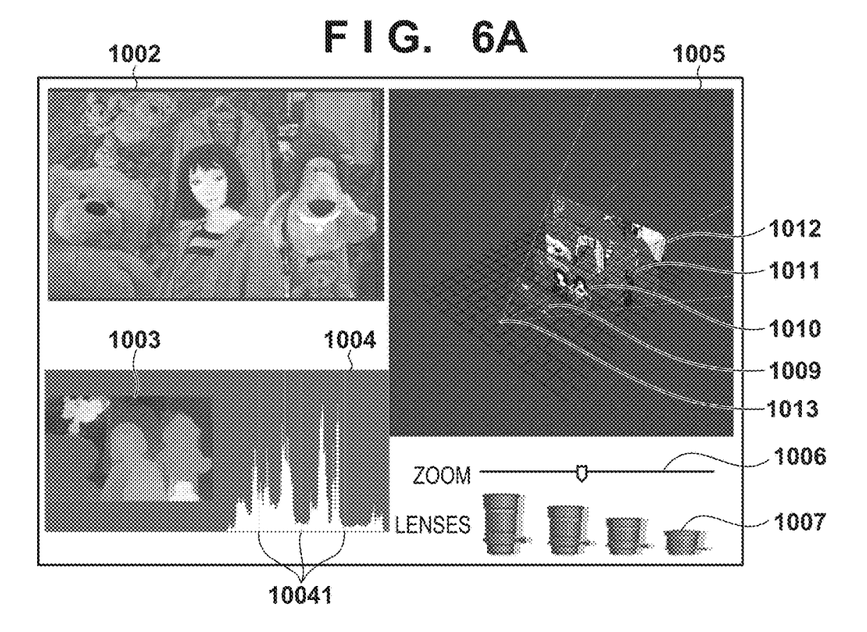
FIGS. 6A and 6B are diagrams showing display examples in the case where different shooting distances (field angles) have been set on a GUI screen similar to that of FIG. 5.
Figure 6B:
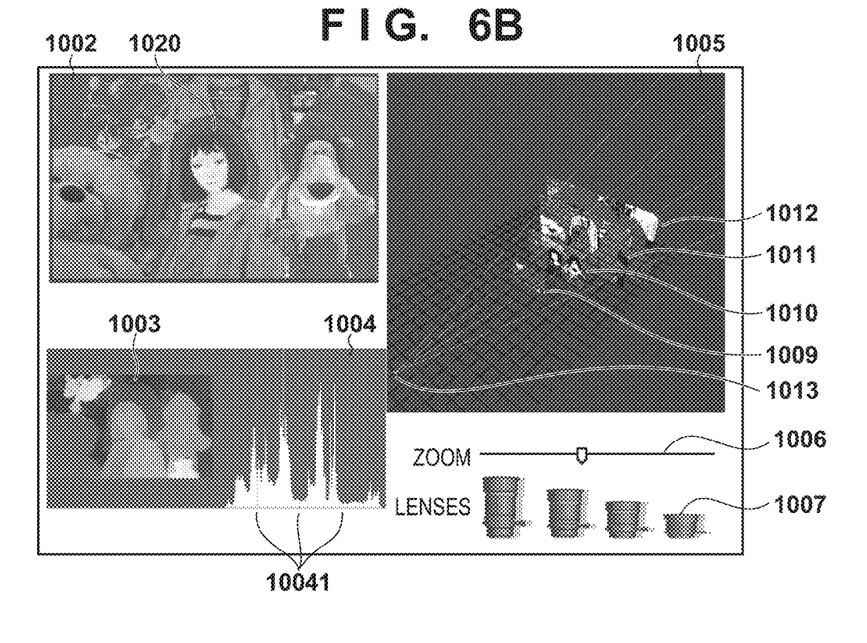

An update example of a display content described herein will be further described with reference to FIGS. 6A and 6B. FIGS. 6A and 6B show display examples in the case where different shooting distances (field angles) are set on a GUI screen similar to that in FIG. 5.

In FIGS. 6A and 6B, the depth is divided in four by three boundaries 10041, and four depth-divided images 1009 to 1012 are generated from the front toward the back, and displayed in the display area 1005 for depth-divided images. FIG. 6B shows a state in which a shooting distance (narrow field angle) that is farther than that during shooting shown in FIG. 6A has been set, and the distance between the depth-divided image 1009 nearest the front and the camera icon 1013 is long. In FIG. 6B, the field angle is set to be narrower than that during shooting, and the depth-divided images toward the back is enlarged relative to a primary divided image, and therefore an area 1020 that lacks pixels around a person, which is a primary subject, is generated.

Figure 7:
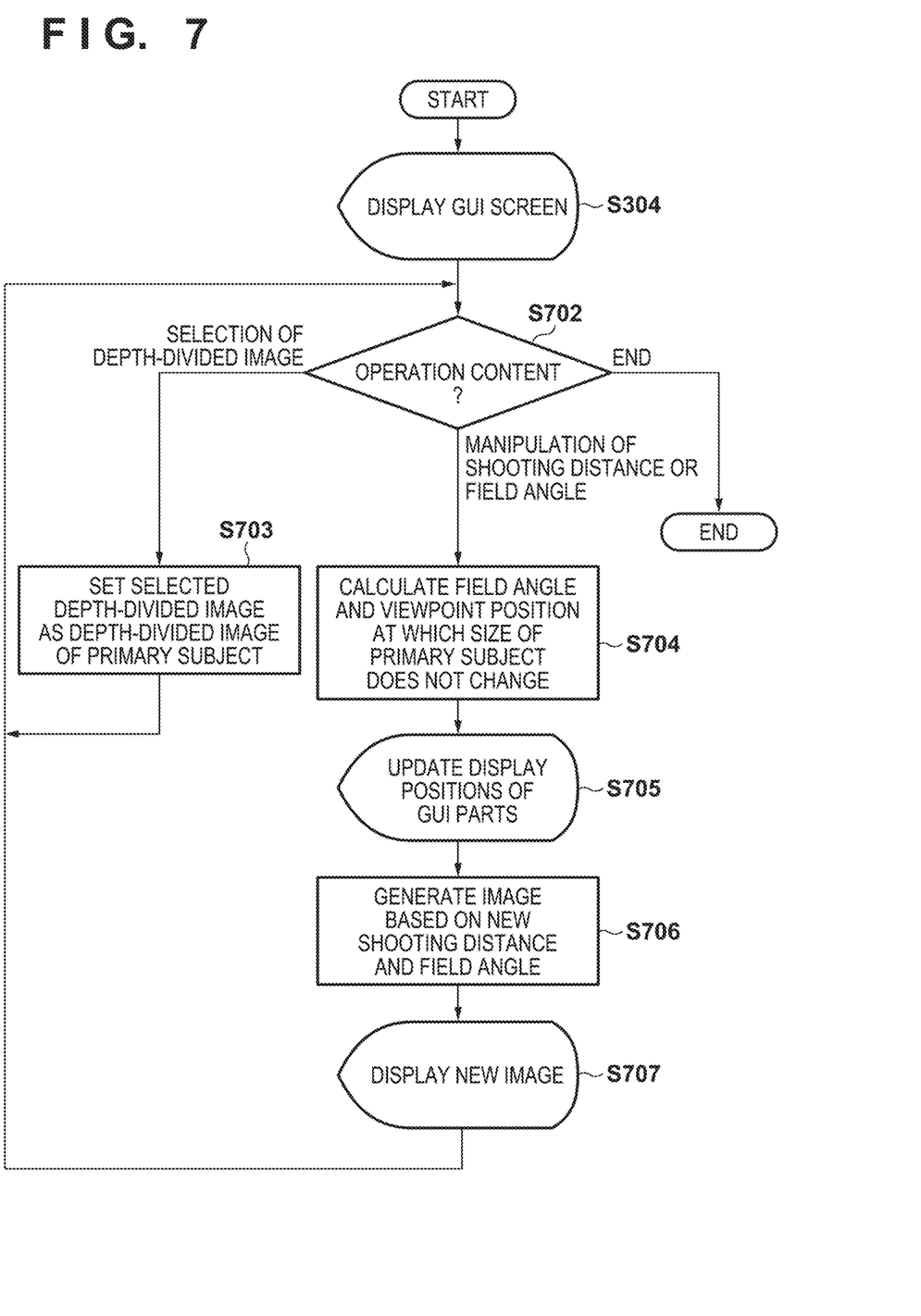
FIG. 7 is a flowchart for describing an operation procedure of the image processing application according to the embodiment.

FIG. 7 is a flowchart outlining an operation procedure for executing the processing described with reference to FIGS. 5, 6A and 6B. Here, it is assumed that in S304 of FIG. 3, the control unit 201 is waiting for an operation in a state in which a GUI of the image processing application such as that shown in FIG. 5, 6A or 6B is displayed.

In S702, the control unit 201 determines the content of an operation on the GUI. The procedure is then advanced to S703 if the operation is an operation for selecting a depth-divided image, the procedure is advanced to S704 if the performed operation is an operation for changing a shooting distance or a field angle, and the application is ended if the performed operation is an end operation.

Note that the operation for selecting a depth-divided image is not particularly limited, and may be a touch operation on one of the depth-divided images that are reduced and displayed on the display area 1005 for depth-divided images, for example.

In S703, the control unit 201 sets the selected depth-divided image as a depth-divided image in which a primary subject exists (hereinafter, referred to as a primary divided image or a primary image), and returns the procedure to S702. Note that the depth-divided image in which the primary subject exists may be automatically selected, without a selection being made by the user. One depth-divided image can be selected based on one or more of conditions, such as a predetermined specific subject (e.g., face) being shown, a predetermined specific subject being in focus, a subject having a certain size (e.g., a rate thereof to the image) or more being shown, a subject being shown near the center of the image, and the like. Note that when returning the procedure to S702, the control unit 201 may output a message or the like to prompt a user to perform the operation for changing the field angle or the shooting distance.

In S702, in the case where it is determined that a performed operation is an operation for changing the shooting distance or the field angle (operation on any of the camera icon 1013, the zoom slider 1006, and the lens icons 1007), the control unit 201 determines whether or not a primary divided image has been set. Here, if a primary divided image has not been set, the control unit 201 may first prompt the user to select a primary divided image and return the procedure to S702, or perform the above-described automatic selection processing.

In S704, the control unit 201 calculates, based on the shooting distance and the field angle after the operation, a shooting distance and a field angle at which the size of the primary divided image (in particular, the primary subject) does not change. For example, this calculation may be interpolation calculation using a table in which discrete combinations of shooting distances and field angles which do not change the size of the primary subject have been stored in advance, or may be calculation using a relational expression of a shooting distance and a field angle that does not change the size of the primary subject.

In S705, the control unit 201, based on the calculation result in S704, changes the display positions of the operation members (GUI parts) for shooting distance and field angle (the camera icon 1013, the zoom slider 1006, and the lens icons 1007), except for the operation members (GUI parts) with respect to which an operation has been detected in S702.

In S706, the control unit 201 uses the image processing unit 205 to apply image processing to the depth-divided images other than the primary divided image, then combines all the depth-divided images, and generates an image that indicates the changed shooting distance and field angle.

Specifically, in the case where the changed shooting distance is longer than that before the change, the image processing unit 205 applies image processing for realizing an effect of narrowing the field angle (lengthening the focal distance) to the depth-divided images other than the primary divided image. The effect of narrowing the field angle can be realized by processing for enlarging the image, for example. Processing for trimming so as to reduce a peripheral area of the image may be combined as necessary. In addition, in the case where the changed shooting distance is shorter than that before the change, the image processing unit 205 applies image processing that realizes an effect of widening the field angle (shortening the focal distance) of the depth-divided images other than the primary divided image. The effect of widening the field angle can be realized by processing for enlarging an area to be trimmed in the image to the peripheral area, or processing for reducing the image and adding a blank area to the surrounding area, for example.

In S707, the control unit 201 displays the combined image generated in S706 as the captured image 1002, and returns the procedure to S702.

Note that description was given here regarding the case where an operation performed on the camera icon 1013 is an operation for changing the shooting distance, and a movable range of the camera is limited to an optical axis during shooting. However, movement in a direction that is orthogonal to the optical axis may be possible. In this case, an operation of the camera icon 1013 corresponds to an operation for changing a three dimensional viewpoint position. In this case, the calculation in S704 is performed with respect to a distance on the optical axis of the changed three dimensional viewpoint position. In addition, a moving process for reflecting the difference between the position of the optical axis during shooting and the three dimensional viewpoint position is added to processing that is applied to the depth-divided images in S706. For example, in the case where the changed viewpoint position has moved vertically upward with respect to the optical axis during shooting, depth-divided images in front of the primary divided image are moved vertically upward, and depth-divided images at the back of the primary divided image are moved vertically downward, by an amount of movement that is in accordance with the distance from the viewpoint position.

In this manner, according to this embodiment, image processing is applied in units of depth-divided images, and thereby an image exhibiting a dolly zoom effect can be easily generated by operating one of the camera icon 1013, the zoom slider 1006, and the lens icons 1007. However, image processing performed in units of depth-divided images can be applied to realize other effects.

For example, an image that cannot be shot in principle can be generated in a pseudo manner. The larger the focal distance of a lens is and the farther the distance is from a subject, the more light entering the lens from the subject approaches a parallel beam, but the light is never completely parallel in actuality. In addition, it is not possible for the light to enter at an angle greater than or equal to parallel. However, image processing performed in units of depth-divided images makes it possible to generate, in a pseudo manner, an image that is obtained under such a condition that is impossible in actuality.

Figure 8:
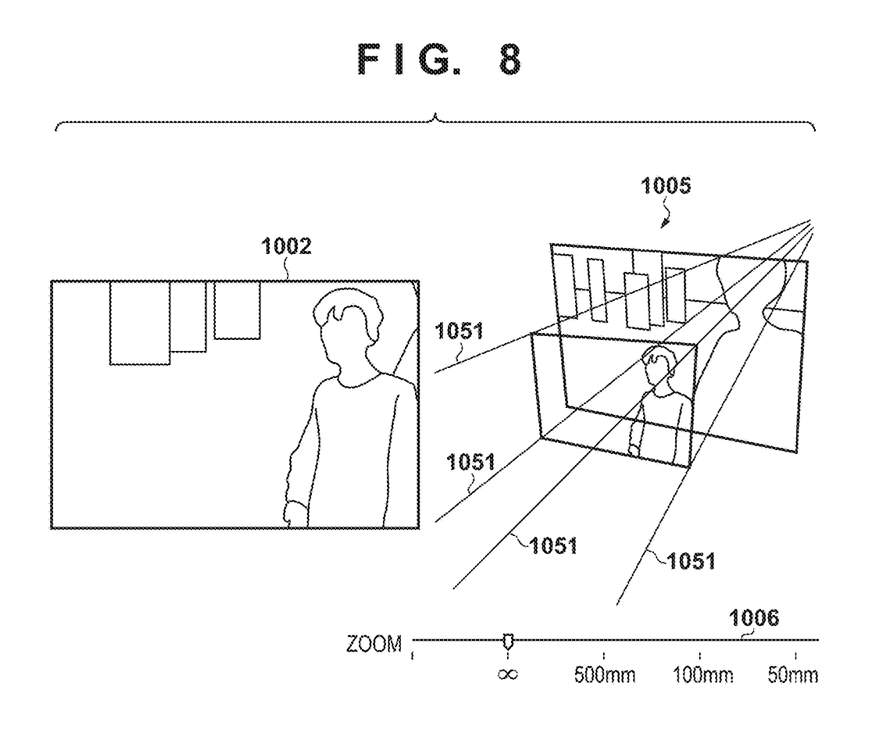
FIG. 8 is a diagram schematically showing an example a GUI and an image in the case of allowing a shooting condition that is impossible in actuality to be set in the image processing application according to the embodiment.

FIG. 8 schematically shows the example of a GUI and an image in the case of allowing such a shooting condition that is impossible in actuality to be set. In FIG. 8, the zoom slider 1006 has graduations of focal distances, to one of which a focal distance "∞" is assigned. In addition, a configuration is adopted in which the zoom slider 1006 is movable to a focal distance that is more than infinity.

In FIG. 8, the zoom slider 1006 is set to a position for setting the focal distance of the lens to infinity. In this case, because light entering the lens from a subject forms a parallel beam, four lines 1051 that indicate a field angle are also parallel in the diagram, and do not converge to a camera icon. The further the zoom slider 1006 is moved to the left (the focal distance of the lens is increased), the more a depth-divided image (e.g., background) corresponding to a distance that is farther than a primary divided image is enlarged (the enlargement rate is increased), and the more a depth-divided image (e.g., foreground) corresponding to a distance that is closer than the primary divided image is reduced (reduction ratio is increased). By setting the position of the zoom slider 1006 to a position for increasing the focal distance of the lens to more than infinity (more to the left side than the state in FIG. 8), it is possible to generate an image having a composition that is impossible in actual shooting.

Figure 9:
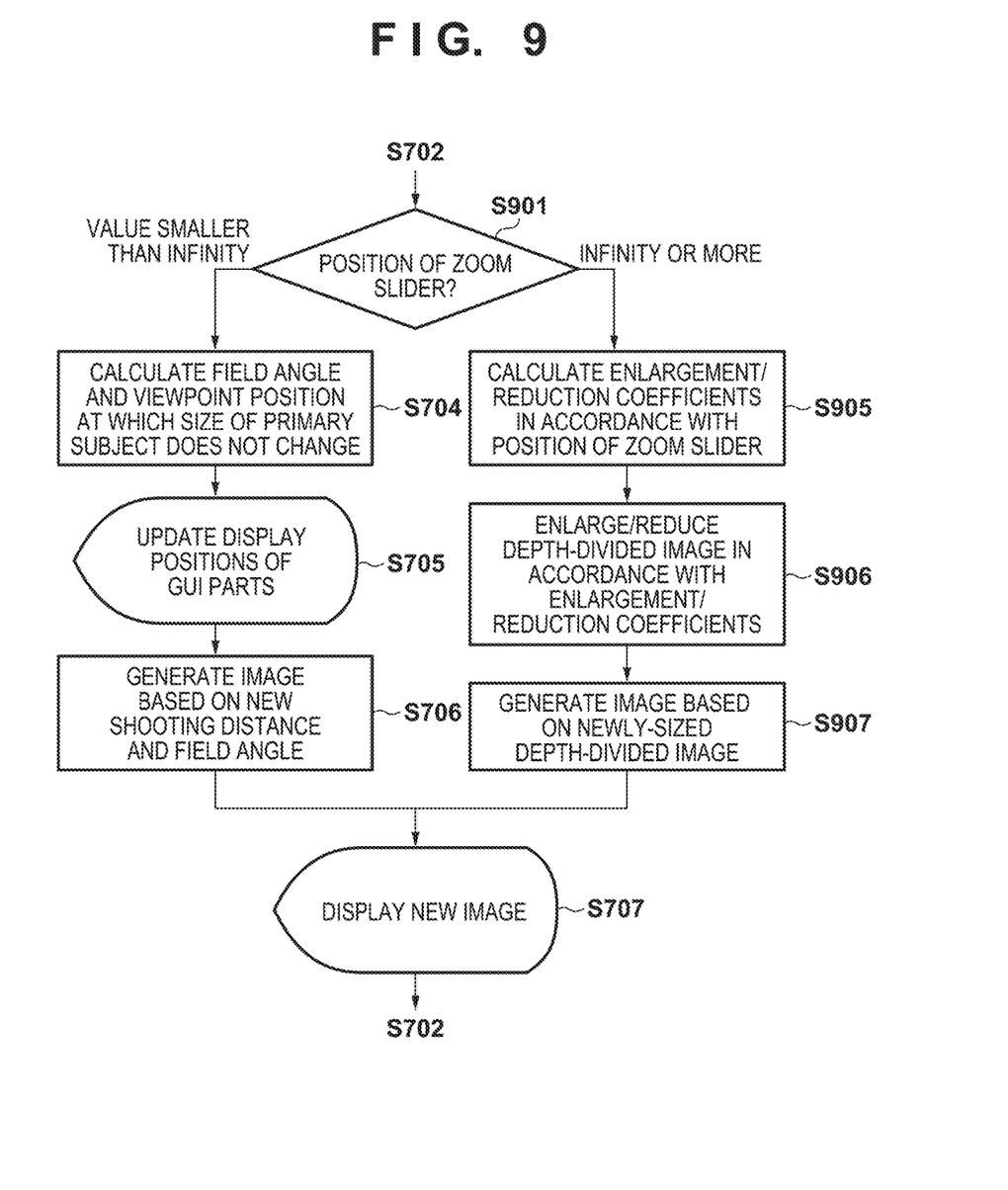
FIG. 9 is a flowchart for describing an image processing operation in the case where a configuration enabling a focal distance that is more than infinity to be set in the image processing application according to the embodiment.

FIG. 9 is a flowchart for describing an image processing operation in the case where a configuration is adopted in which the zoom slider 1006 is movable to a focal distance that is more than infinity. FIG. 9 shows processing in the case where it is determined in S702 of FIG. 7 that a performed operation is an operation for changing a shooting distance or a field angle, and the same reference numerals as those of FIG. 7 are assigned to processing similar to that of FIG. 7.

In S901, the control unit 201 determines whether or not the position of the zoom slider 1006 is a position for setting a focal distance that is infinity or more, and if the position is a position for setting a focal distance that is less than infinity, processing of S704 onward that was described with reference to FIG. 7 is performed. On the other hand, if the position is the position for setting the focal distance that is infinity or more, the control unit 201 shifts the procedure to S905.

In S905, the control unit 201 calculates enlargement/reduction coefficients that are in accordance with the position of the zoom slider 1006, or more specifically, the amount of movement that is more than infinity. As described above, the more the focal distance is increased, the more depth-divided images (e.g., background) corresponding to a distance that is farther than the primary divided image are enlarged (the enlargement rate is increased), and the more depth-divided images (e.g., foreground) corresponding to a distance that is closer than the primary divided image are reduced (the reduction ratio is increased).

The control unit 201 calculates the enlargement/reduction coefficients such that the magnification of the depth-divided images other than the primary divided image, in a combined image of the depth-divided images, continuously changes when the zoom slider 1006 is moving from a focal distance that is less than infinity to a position corresponding to a focal distance that is infinity or more.

In S906, the control unit 201 uses the image processing unit 205 to apply an enlarging process or a reducing process to each of the depth-divided images in accordance with the enlargement/reduction coefficients calculated in S905.

In S907, the control unit 201 uses the image processing unit 205 to generate an image corresponding to the position of the zoom slider 1006 by combining a newly sized depth-divided image that has been enlarged or reduced in S906.

In S908, the control unit 201 displays the image that has been generated in S706 or S907 and corresponds to the position of the zoom slider 1006 as the captured image 1002.

In this manner, according to this embodiment, an image corresponding to a shooting condition that is impossible in actuality can be generated.

Note that when an image is generated to which an effect of changing a shooting distance and a field angle during shooting is applied, an area that lacks pixels such as the area 1020 in FIG. 6B appears in some cases. Such lack of pixels that occurs in a portion that was hidden by a subject that is in front thereof is called occlusion. In the example of FIG. 6B, the area 1020 exhibits occlusion of a background portion that was hidden by a person in front thereof during shooting.

Because the appearance is not satisfactory while occlusion is occurring, it is desirable that the occlusion is made not noticeable by a certain method, but processing for image interpolation can become complicated in some cases. A method for hiding an occlusion area by a simple method by changing the size and position of a depth-divided image will be described below with reference to FIGS. 10 and 11.

Figure 10:
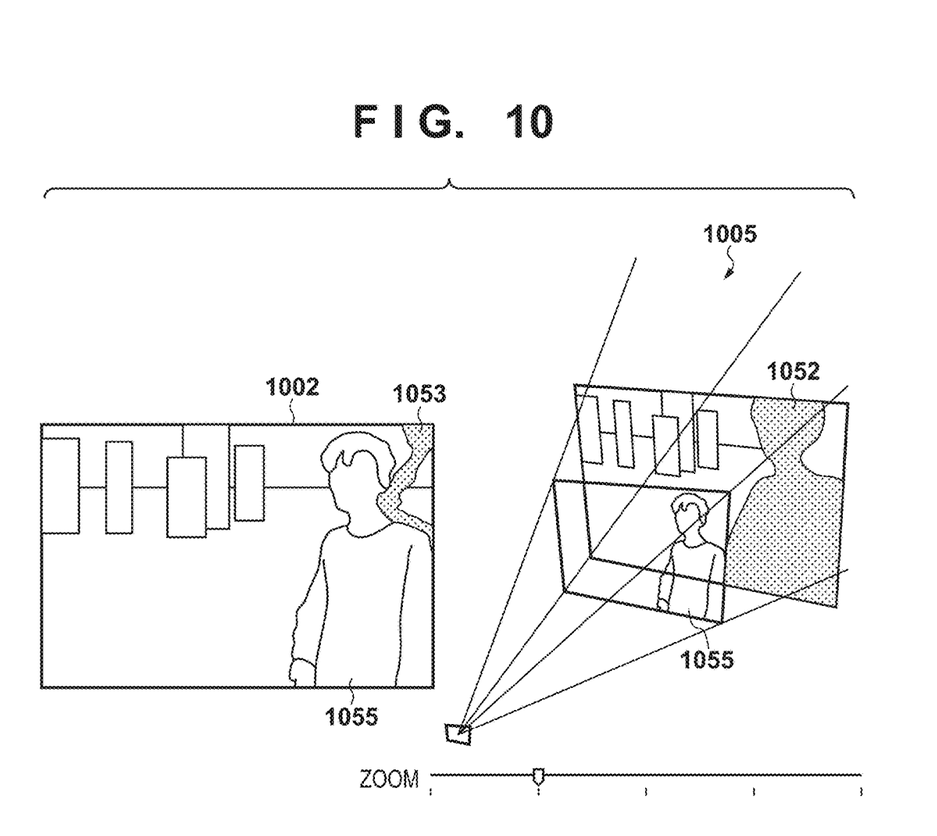
FIG. 10 is a diagram showing a display example of a state in which occlusion has occurred in the image processing application according to the embodiment.

FIG. 10 shows the example of a GUI screen in a state where occlusion has occurred. In FIG. 10, as a result of performing an operation of narrowing a field angle (increasing a focal distance), a depth-divided image of the background is enlarged, and a part of a portion 1052 that was hidden by a primary subject (person) 1055 appears as occlusion 1053 in the combined image 1002.

Figure 11:
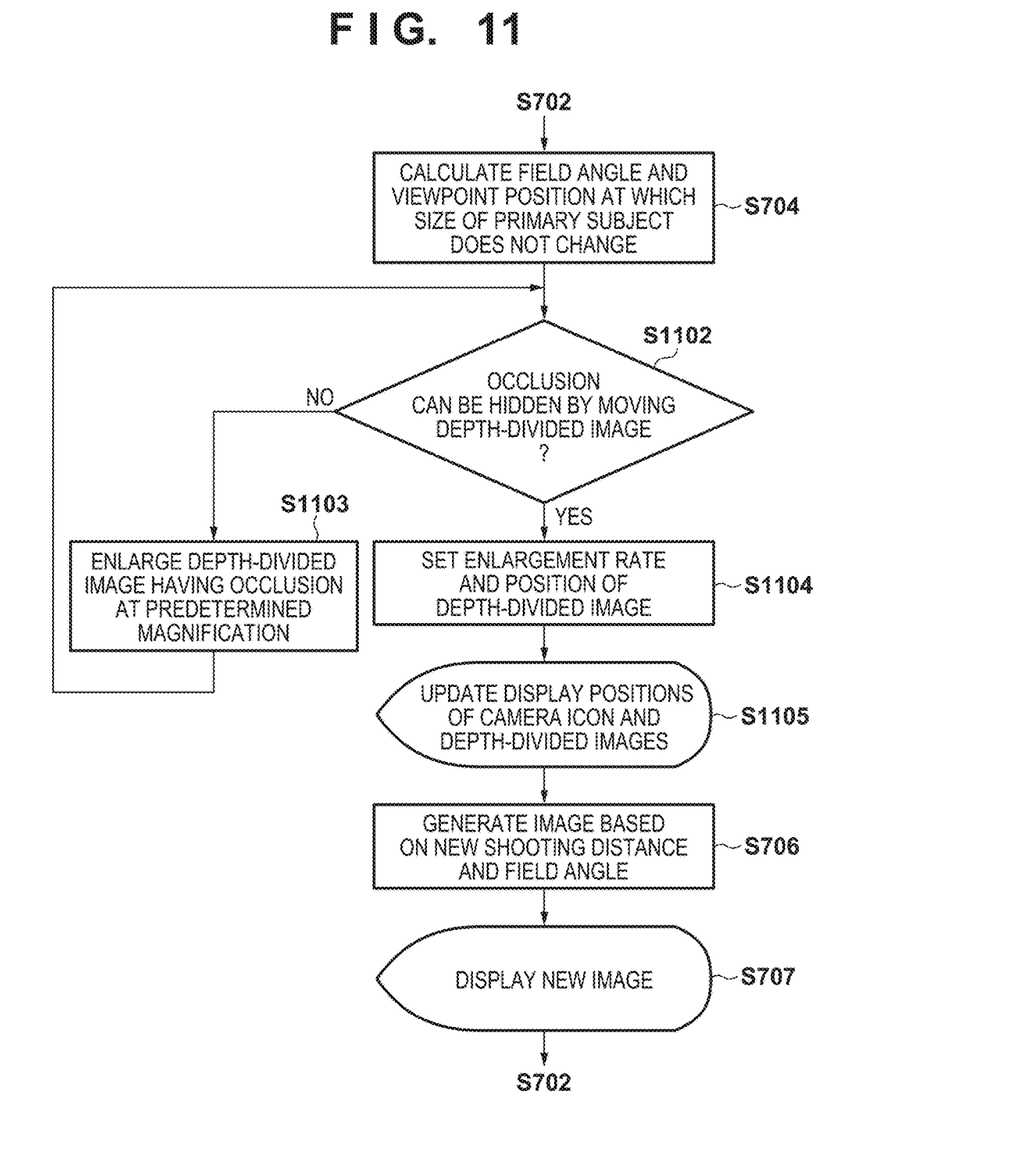
FIG. 11 is a flowchart for describing a method for hiding occlusion in the image processing application according to the embodiment.

A method for hiding occlusion will be described with reference to the flowchart in FIG. 11. FIG. 11 shows processing in the case where it is determined in S702 of FIG. 7 that a performed operation is the operation of changing the shooting distance or the field angle, similarly to FIG. 9. The same reference numerals as those in FIG. 7 are assigned to processing similar to that of FIG. 7, and description thereof is omitted.

In S1102, the control unit 201 determines whether or not the occlusion can be hidden by moving, in the vertical and horizontal directions, each of the depth-divided images to which image processing in accordance with the shooting distance and the field angle calculated in S704 has been applied. For example, if, compared to a depth-divided image in which occlusion has occurred, a depth-divided image in front thereof, which is the cause of the occlusion, is sufficiently large, the occlusion can be hidden by moving one of the depth-divided images such that the depth-divided image in front is layered on the occlusion area. Alternatively, it is possible to remove the occlusion area to the outside of an area that is to be used for the combined image by moving the depth-divided image in which the occlusion has occurred, thereby preventing the occlusion from appearing in the captured image 1002. These conditions are merely exemplary, and the determination can be performed based on other conditions. The control unit 201 advances the procedure to S1104 if it is determined that the occlusion can be hidden by moving the depth-divided images in the vertical and horizontal directions, and advances the procedure to S1103 if it is determine that the occlusion cannot be hidden.

In S1103, the control unit 201 applies an enlarging process at a predetermined magnification to the depth-divided image having the occlusion (the depth-divided image of the background), and returns the procedure to S1102. By gradually enlarging the depth-divided image, it is ultimately possible to completely remove the occlusion part to the outside of the area to be used for the combined image, or reduce it to a size that allows the occlusion part to be hidden by moving the depth-divided image, by minimum necessary enlargement.

In S1104, the control unit 201 takes over the enlargement rate of the depth-divided image set in S1103, and sets the enlargement rate and the position of each of the depth-divided images. The positions are defined such that the occlusion does not appear on the combined image, while the positions of the depth-divided images are not unnecessarily moved from the initial positions. For example, the control unit 201 first determines a direction of movement and an amount of movement for hiding the occlusion, with respect to the depth-divided image immediately in front of the depth-divided image in which the occlusion has occurred. Next, the control unit 201 determines whether or not new occlusion will occur by moving the depth-divided image in the determined direction of movement and by the determined amount of movement, and ends the calculation of the direction of movement and the amount of movement when it is determined that new occlusion will not occur. In the case where new occlusion will occur, the control unit 201 similarly determines a direction of movement and an amount of movement, with respect to a depth-divided image in front of the depth-divided image immediately in front of the depth-divided image in which the occlusion has occurred. By sequentially repeating such processing with respect to a depth-divided image at the front, the direction of movement and the amount of movement are determined for each of the depth-divided images.

In S1105, the control unit 201 moves the display position of the camera icon 1013 to the position calculated in S704. The control unit 201 also uses the image processing unit 205 to change the size (the enlargement rate) and the position of a depth-divided image to the value calculated in S1104. After that, S706 and S707 are executed as described with reference to FIG. 7.

As described above, in accordance with this embodiment, image processing that cannot be conventionally realized can be easily provided by dividing a captured image into a plurality of images in accordance with a distance range of a subject using distance information of the captured image, and performing image processing in units of the divided images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-019612, filed on Feb. 3, 2015, which is hereby incorporated by reference herein in its entirety.

What is claimed is:

1. An image processing apparatus comprising:
an obtaining unit configured to obtain a captured image and distance information of a subject;
a generation unit configured to generate, from the captured image, a plurality of images that respectively correspond to ranges of individual subject distances, based on the distance information;
an operation unit configured to receive input of an instruction to change a shooting distance and a field angle of the captured image;
an image processing unit configured to apply image processing to at least one of the plurality of images; and
a combining unit configured to combine the plurality of images that include an image to which the image processing has been applied, and generate a combined image corresponding to the changed shooting distance and field angle that were instructed through the operation unit,
wherein a primary image is set from among the plurality of images, and the image processing unit applies image processing to at least one of the plurality of images, such that a size of the primary image in the combined image before and after changing the shooting distance and field angle does not change.

2. The image processing apparatus according to claim 1, wherein the image processing unit applies an enlarging process or a reducing process to at least one of the plurality of images other than the primary image.

3. The image processing apparatus according to claim 1, wherein the operation unit is further configured to receive input of an instruction to change a viewpoint position, and
the image processing unit applies a moving process to at least one of the plurality of images other than the primary image, in a case where changing of the viewpoint position is instructed.

4. The image processing apparatus according to claim 1, further comprising:
a determination unit configured to determine whether or not an area that lacks pixels occurs in the combined image,
wherein the image processing unit further applies an enlarging process or a moving process for hiding the area that lacks pixels to at least one of the plurality of images, in a case where it is determined that the area that lacks pixels occurs in the combined image.

5. The image processing apparatus according to claim 1, further comprising:
a selection unit configured to set, as the primary image, one image that meets a predetermined condition out of the plurality of images.

6. The image processing apparatus according to claim 5, wherein the predetermined condition is at least one of a predetermined subject selected by a user being shown, a predetermined subject selected by a user being in focus, a subject having a certain size or more being shown, and a subject being shown near a center of the image.

7. The image processing apparatus according to claim 1, further comprising:
a display control unit configured to display, on a display apparatus, the plurality of images and the combined image generated by the combining unit.

8. The image processing apparatus according to claim 7, wherein the display control unit displays, as the operation unit, a graphical user interface (GUI), whose position is changeable, at a position corresponding to a shooting position of the plurality of images, together with the plurality of images.

9. The image processing apparatus according to claim 7, wherein the display control unit displays, as the operation unit, a graphical user interface (GUI) for specifying a focal distance of a lens.

10. The image processing apparatus according to claim 7, wherein the display control unit displays a plurality of GUIs as the operation unit, and in a case where one of the plurality of GUIs is operated, updates display positions of remaining GUIs out of the plurality of GUIs in accordance with a position of the operated GUI after being operated.

11. An image processing method to be executed by an image processing apparatus, comprising:
obtaining a captured image and distance information of a subject;
generating, from the captured image, a plurality of images that respectively correspond to ranges of individual subject distances, based on the distance information;
receiving input of an instruction to change a shooting distance and a field angle of the captured image;
applying image processing to at least one of the plurality of images; and
combining the plurality of images that include an image to which the image processing has been applied, and generating a combined image corresponding to the changed shooting distance and field angle that were received,
wherein a primary image is set from among the plurality of images, and the image processing is applied to at least one of the plurality of images, such that a size of the primary image in the combined image before and after changing the shooting distance and field angle does not change.

12. A non-transitory computer-readable recording medium that stores a computer-executable program, the program, when executed by the computer, causing the computer to function as an image processing apparatus comprising:
an obtaining unit configured to obtain a captured image and distance information of a subject;
a generation unit configured to generate, from the captured image, a plurality of images that respectively correspond to ranges of individual subject distances, based on the distance information;
an operation unit configured to receive input of an instruction to change a shooting distance and a field angle of the captured image;
an image processing unit configured to apply image processing to at least one of the plurality of images; and
a combining unit configured to combine the plurality of images that include an image to which the image processing has been applied, and generate a combined image corresponding to the changed shooting distance and field angle that were instructed through the operation unit,
wherein a primary image is set from among the plurality of images, and the image processing unit applies image processing to at least one of the plurality of images, such that a size of the primary image in the combined image before and after changing the shooting distance and field angle does not change.

* * * * *